United States Patent
Ha et al.

(10) Patent No.: US 10,138,932 B2
(45) Date of Patent: Nov. 27, 2018

(54) AIR FOIL THRUST BEARING

(71) Applicants: Hyundai Motor Company, Seoul (KR); Kia Motors Corporation, Seoul (KR)

(72) Inventors: Kyoung-Ku Ha, Anyang-si (KR); Chang-Ha Lee, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/640,721

(22) Filed: Jul. 3, 2017

(65) Prior Publication Data

US 2018/0172067 A1 Jun. 21, 2018

(30) Foreign Application Priority Data

Dec. 15, 2016 (KR) .................. 10-2016-0171898

(51) Int. Cl.
| F16C 17/04 | (2006.01) |
| F16C 27/08 | (2006.01) |
| F16C 33/10 | (2006.01) |
| F16C 43/02 | (2006.01) |

(52) U.S. Cl.
CPC .......... *F16C 17/042* (2013.01); *F16C 17/047* (2013.01); *F16C 27/08* (2013.01); *F16C 33/1075* (2013.01); *F16C 43/02* (2013.01); *F16C 2226/36* (2013.01); *F16C 2300/22* (2013.01)

(58) Field of Classification Search
CPC .... F16C 17/024; F16C 17/042; F16C 17/047; F16C 27/08; F16C 43/022; F16C 33/1075; F16C 33/106; F16C 33/108; F16C 2226/10; F16C 33/36; F16C 33/52; F16C 2300/02; F16C 2300/22
USPC .......................... 384/99, 105, 106, 121, 125
See application file for complete search history.

(56) References Cited

U.S. PATENT DOCUMENTS

| 4,082,375 A | * | 4/1978 | Fortmann | F16C 17/042 384/105 |
| 4,225,196 A | * | 9/1980 | Gray | F16C 17/042 384/121 |
| 4,247,155 A | * | 1/1981 | Fortmann | F16C 17/024 384/124 |
| 4,462,700 A | * | 7/1984 | Agrawal | F16C 17/042 384/105 |
| 5,584,582 A | * | 12/1996 | Brown | F16C 17/024 29/898.02 |
| 8,147,143 B2 | * | 4/2012 | Struziak | F16C 17/042 384/103 |

(Continued)

FOREIGN PATENT DOCUMENTS

| EP | 2487376 A2 | 8/2012 | |
| KR | 20090060661 A | * 6/2009 | .............. F16C 32/06 |
| WO | WO-2011043607 A2 | * 4/2011 | .............. F16C 17/042 |

*Primary Examiner* — Marcus Charles
(74) *Attorney, Agent, or Firm* — McDonnell Boehnen Hulbert & Berghoff LLP (57) ABSTRACT

The present disclosure relates to an improved air foil thrust bearing having a reduced number of components and an increased load support area. The improved air foil thrust bearing comprises a base plate and a plurality of foils attached to the base plate, wherein each of the foils comprises a top foil section and a bump foil section connected to and integral with the top foil section.

12 Claims, 8 Drawing Sheets

(56) References Cited

U.S. PATENT DOCUMENTS

| | | | |
|---|---|---|---|
| 9,157,472 B2* | 10/2015 | Kim | F16C 17/042 |
| 9,175,722 B1* | 11/2015 | Park | F16C 17/042 |
| 9,394,946 B2* | 7/2016 | Rocchi | F16C 17/024 |
| 9,470,260 B2* | 10/2016 | Struziak | F16C 43/02 |
| 2002/0097927 A1* | 7/2002 | Lee | F16C 17/024 |
| | | | 384/103 |
| 2012/0207414 A1* | 8/2012 | Kim | F16C 17/042 |
| | | | 384/105 |
| 2015/0219147 A1* | 8/2015 | Furuno | F16C 17/047 |
| | | | 384/105 |

* cited by examiner

AIR FOIL THRUST BEARING

CROSS-REFERENCE TO RELATED APPLICATION

This application is based on and claims the benefit of and priority to Korean Patent Application No. 10-2016-0171898, filed on Dec. 15, 2016, in the Korean Intellectual Property Office, the disclosure of which is incorporated herein in its entirety by reference.

TECHNICAL FIELD

The present disclosure relates to an air foil thrust bearing, and more particularly to an air foil thrust bearing having a reduced number of components and an increased load support area.

BACKGROUND

An air foil thrust bearing is a bearing that supports a thrust of a rotary body by using an air film and pressure distribution generated between a shaft that rotates at a high speed and an air foil, and is distinguished from a ball bearing or a roller bearing that reduces friction through rolling and a slide bearing that supports a thrust by using an oil film.

The air foil thrust bearing is used in turbo machinery such as a compressor or a blower.

Figure 1:
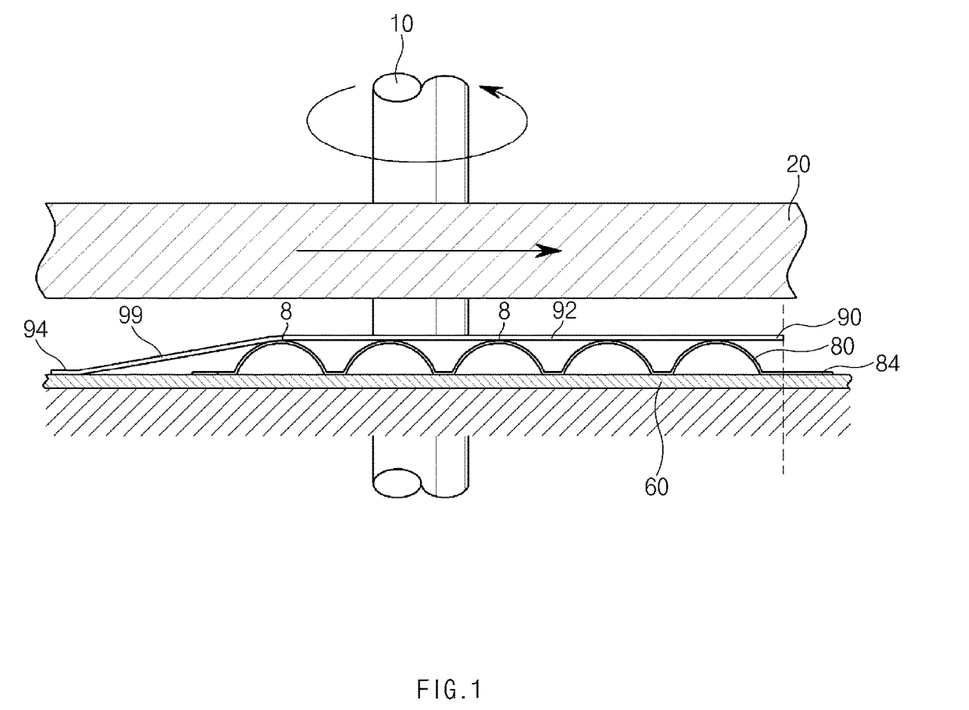
FIG. 1 is a side sectional view illustrating a conventional air foil thrust bearing.

As illustrated in FIG. 1, in the air foil thrust bearing, bump foils 80 are disposed on an upper surface of a base plate 60 and top foils 90 are disposed on the upper surfaces of bump foils 80.

Each top foil 90 may have an inclined section 99 and a flat portion 92, and each bump foil 80 may comprise a plurality of bumps 8.

When operation of a rotor 10 causes a bearing disk 20 to rotate, pressure is formed between top foils 90 and bearing disk 20 to support a load as air is introduced along the inclined sections 99 of top foils 90.

Edge portions 94 of the top foils 90 may be attached to base plate 60, for example by welding, and edge portions 84 of the bump foils 80 also may be attached to the base plate 60, again using a process such as welding.

Thus, in the conventional air foil thrust bearing, top foils 90 are individually disposed on bump foils 80 and the number of top foils 90 must equal the number of bump foils 80. Accordingly, the number of assembled components increases and the assembly process becomes more complex. For example, when six top foils 90 are installed, six corresponding bump foils 80 must be installed and the total number of the components is twelve.

Further, in the conventional air foil thrust bearing, because the edge portions 94 of top foils 90 and the edge portions 84 of bump foils 80 are attached to base plate 60 through welding, the edge portions 94 of the top foils 90 and the edge portions 84 of the bump foils 80 must have sufficient lengths for welding. This increases the dead zones of flat portions 92 of top foils 90, such that the flat portions 92 of the top foils 90 are shortened, and accordingly, the load support area is reduced resulting in decreased stability during high-speed driving due to the low load support force.

SUMMARY

The present disclosure provides an improved air foil thrust bearing having a reduced number of components and an increased load support area.

In accordance with an aspect of the present disclosure, there is provided an air foil thrust bearing comprising a base plate and a plurality of foils attached to the base plate, wherein each of the foils comprises a top foil and a bump foil connected to and integrated with the top foil.

The bump foil may comprise a plurality of bumps, and the plurality of bumps may protrude towards the top foil.

The plurality of foils may be arranged on an upper surface of the base plate along a circumferential direction of the base plate.

A top foil of each of the plurality of circumferentially adjacent foils may be superposed on a bump foil of an adjacent one of the plurality of foils.

A bump foil of each of the plurality of foils may be located below a top foil of an adjacent one of the plurality of foils.

The top foil may have a flat upper surface.

An inclined section may be formed between the top foil and the bump foil.

An attachment section may be formed between the inclined section and the bump foil and attached to the base plate.

The attachment section may be foldable and the bump foil and the top foil may be superposed on each other as the attachment section is folded.

The plurality of bumps also may protrude in a direction away from top foil.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. For reference, the sizes of the components and the thickness of the lines of the drawings may be rather exaggerated for convenience of understanding. Further, the terms used in the description of the present disclosure may be different according to the users, the intentions of the operators, or the customs in consideration of the functions in the present disclosure. Therefore, definition of the terms should be made according to the overall disclosure set forth herein.

Referring to FIGS. 2 to 6, an air foil thrust bearing 30 according to a first embodiment of the present disclosure may include a plurality of foils 40 attached to an upper surface of a base plate 31.

The upper surface of base plate 31 is flat, and the plurality of foils 40 may be attached to the flat upper surface of base plate 31 through welding, a coupling unit (rivets), or any other suitable process.

One or more mounting lugs 32 may be formed at a periphery of base plate 31, and each mounting lug 32 may include a mounting recess 33, to which a coupling member or the like may be coupled. Mounting lugs 32 allow base plate 31 to be firmly mounted on a turbo machine or the like. According to an example embodiment, a plurality of mounting lugs 32 may be formed along the periphery of base plate 31 and spaced apart from each other.

Figure 2:
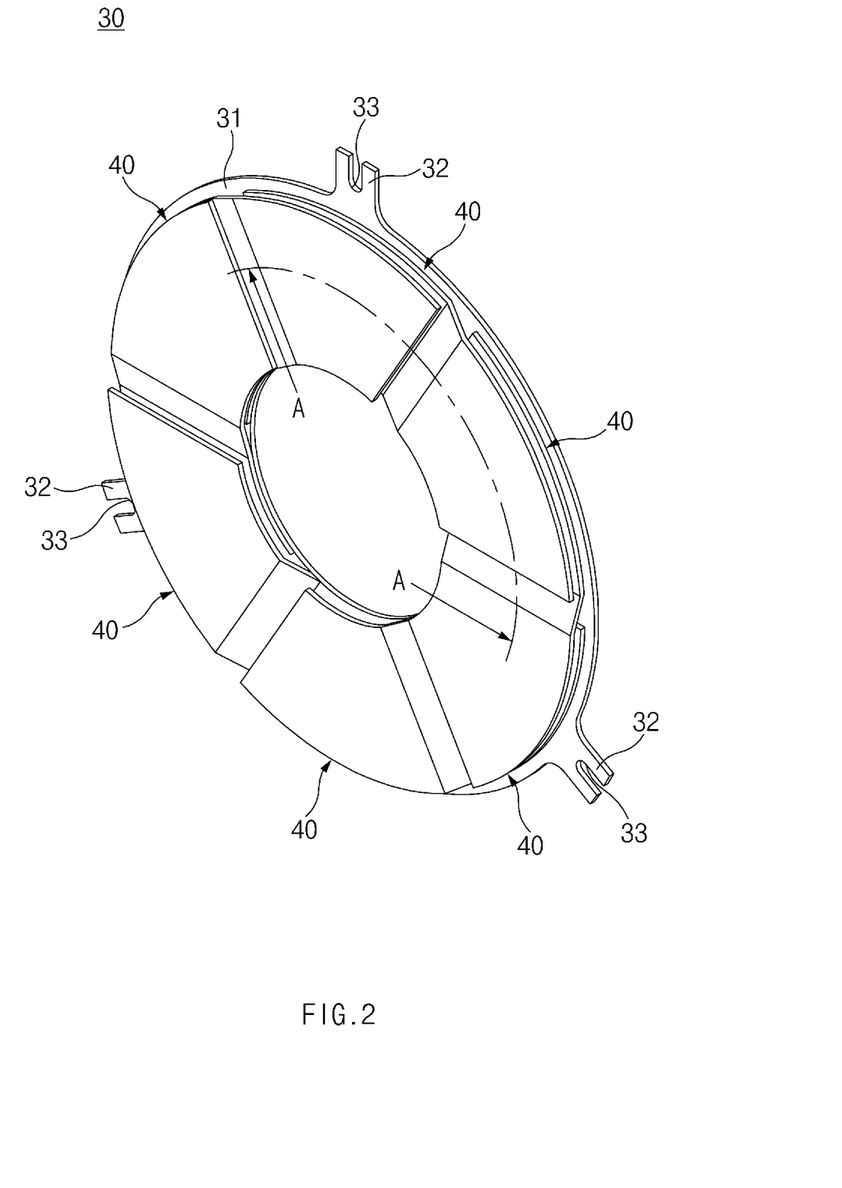
FIG. 2 is a view illustrating an air foil thrust bearing according to a first embodiment of the present disclosure.
Figure 3:
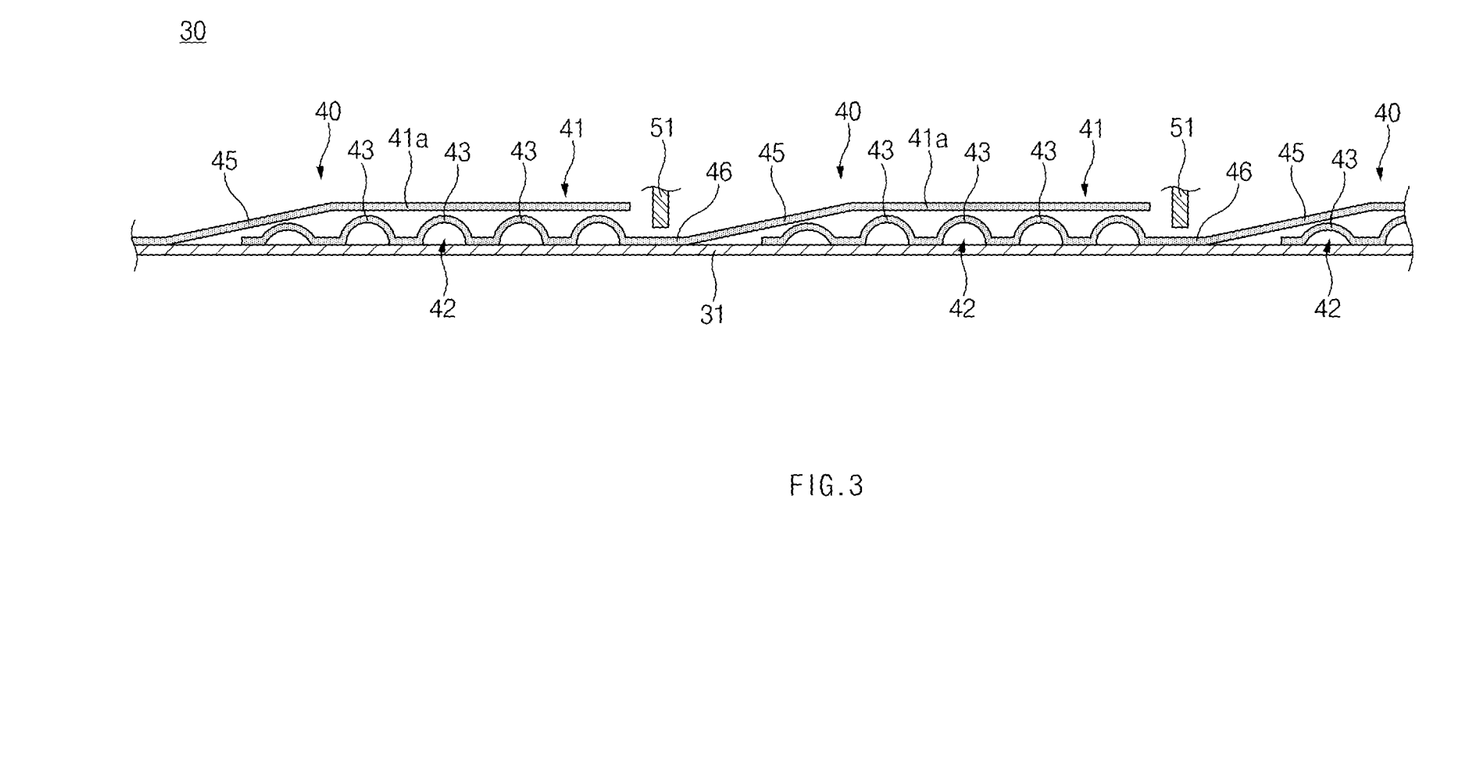
FIG. 3 is a sectional view taken along line A-A of FIG. 2.
Figure 4:
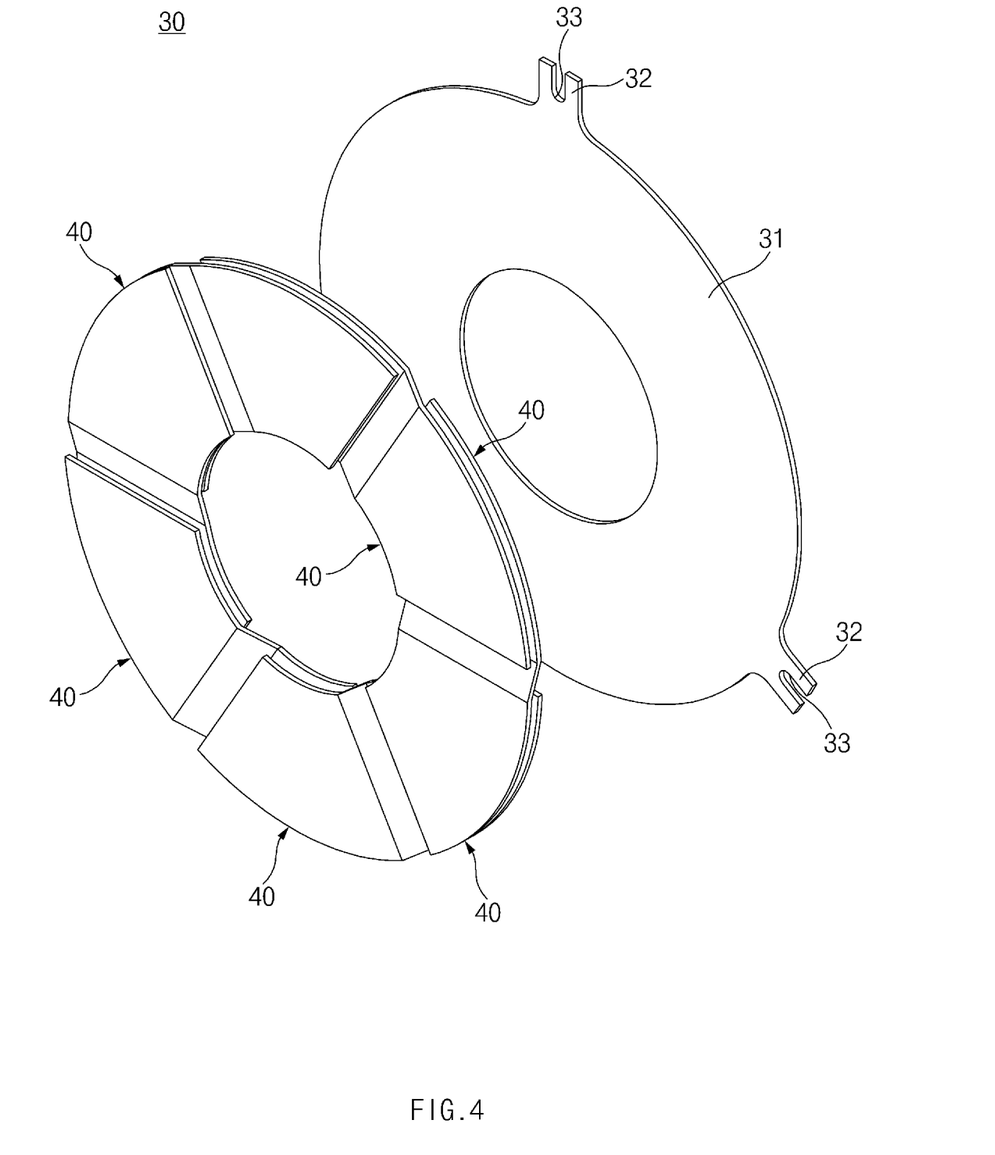
FIG. 4 is an exploded view illustrating the air foil thrust bearing according to the first embodiment of the present disclosure.

As illustrated in FIG. 3, at least portions of adjacent foils 40 may be superposed on each other. As illustrated in FIGS. 2 and 4, the plurality of foils 40 may be arranged on the upper surface of base plate 31 along a circumferential direction of base plate 31 while at least portions thereof are superposed on each other.

Figure 5:
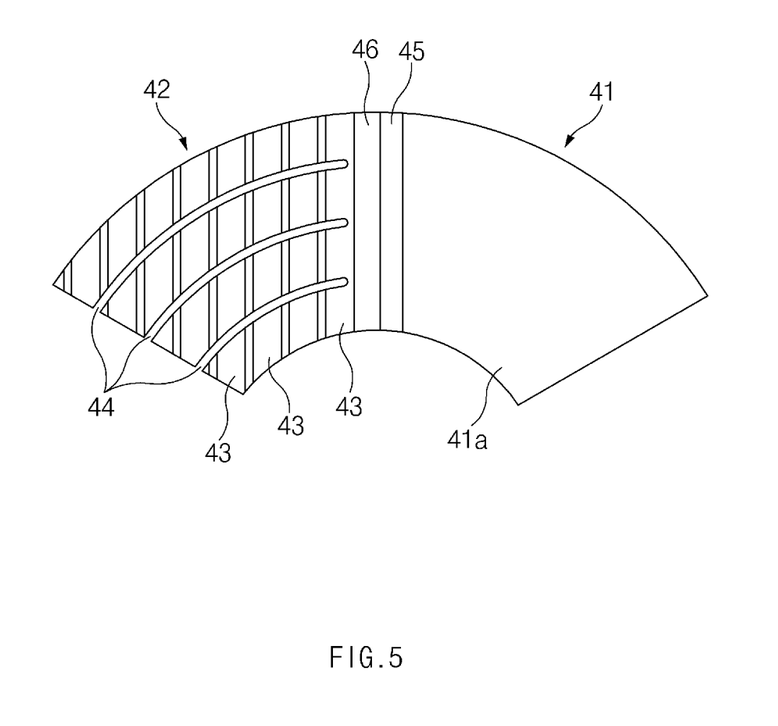
FIG. 5 is a view illustrating a foil member of the air foil thrust bearing according to the first embodiment of the present disclosure.
Figure 6:
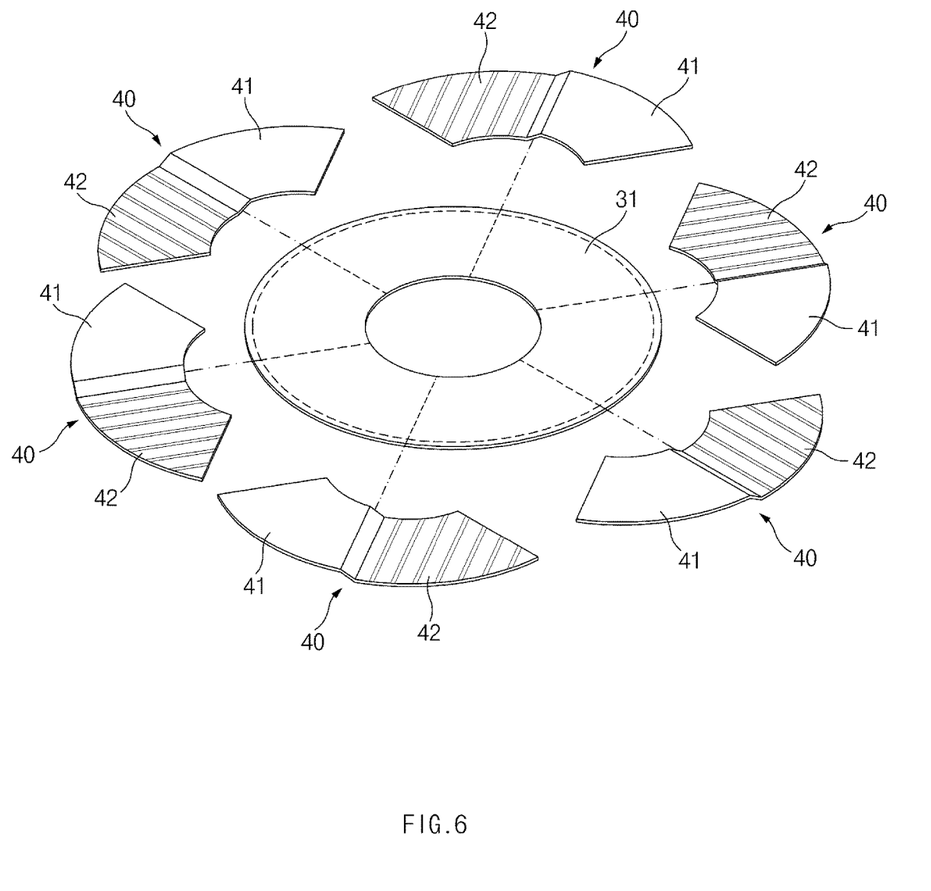
FIG. 6 is a view illustrating foils of the air foil thrust bearing assembled in a trust plate, according to the first embodiment of the present disclosure.

Referring to FIG. 5, each foil 40 may comprise a top foil section 41, and a bump foil section 42 connected to and integrated with top foil section 41.

Top foil 41 has a flat surface 41a on an upper surface thereof, which constitutes a load support surface.

Bump foil section 42 may be connected to and integrated with top foil section 41 through an inclined section 45, and bump foil section 42 may be located below the top foil section 41.

Referring to FIGS. 3 and 5, the bump foil section 42 may comprise a plurality of bumps 43, which may be spaced apart from each other by a specific distance. As shown in FIGS. 2 to 6, in an example embodiment, the plurality of bumps 43 may protrude towards top foil section 41.

Referring to FIG. 5, bump foil section 42 may have one or more slots 44 that cross bumps 43.

An inclined section 45 may be formed between top foil section 41 and bump foil section 42. According to an example embodiment, inclined section 45 may be inclined at a specific inclination angle to connect a periphery of the top foil section 41 and a periphery of the bump foil section 42, and the inclination angle of the inclined section 45 may correspond to a height difference between the top foil section 41 and the bump foil section 42. According to another example embodiment, inclined section 45 may be curved.

An attachment section 46 may be formed between a lower end of the inclined section 45 and bump foil section 42, and attachment section 46 may be attached to base plate 31 through welding.

Attachment section 46 may be configured to have a specific length to form a space for performing welding using a welding machine 51. By disposing attachment section 46 between top foil section 41 and bump foil section 42 of each foils 40, the present disclosure may significantly reduce the number of welding operations needed compared with conventional air foil thrust bearings.

Referring to FIGS. 2 to 4 and 6, top foil section 41 of one foil member 40 is located above bump foil section 42 of another adjacent foil member 40, such that the top foils 41 and the bump foils 42 are superposed on each other along a circumferential direction of base plate 31. Attachment sections 46 of foils 40 may be attached to the upper surface of base plate 31 through welding.

Thus, according to the first example embodiment of the present disclosure, as the foils 40 that are adjacent to each other circumferentially are superposed on each other, the number of assembled components may be reduced to half of the number of components of the conventional air foil thrust bearing. For example, when the conventional air foil thrust bearing requires six top foils, the number of assembled components is twelve as six bump foils are required to correspond to six top foils, and accordingly, twelve welding processes may be required because twelve components must be attached individually through welding.

In contrast, according to the present disclosure, as top foils 41 and bump foils 42 are integral, the number of assembled components is reduced to six, and accordingly, the assembly process is simplified as only six welding processes are required. This reduces both the time needed and the cost of the assembly process.

Further, according to the example embodiments of the present disclosure, because attachment section 46 is provided between top foil section 41 and bump foil section 42, dead zones for welding may be significantly reduced as compared with conventional thrust bearings, resulting in an increased flat surface 41a area and a corresponding increase in load support area which improves stability during high-speed driving.

Figure 7:
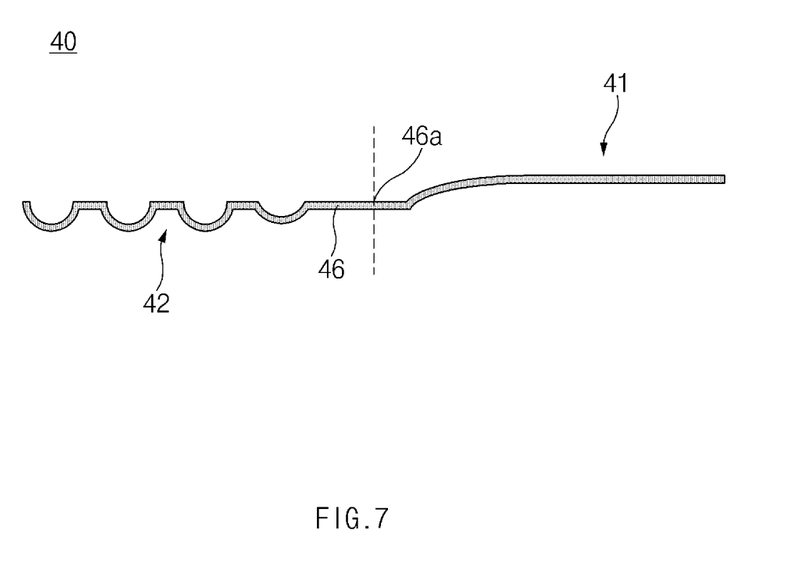
FIG. 7 is a view illustrating a foil of an air foil thrust bearing according to a second embodiment of the present disclosure.
Figure 8:
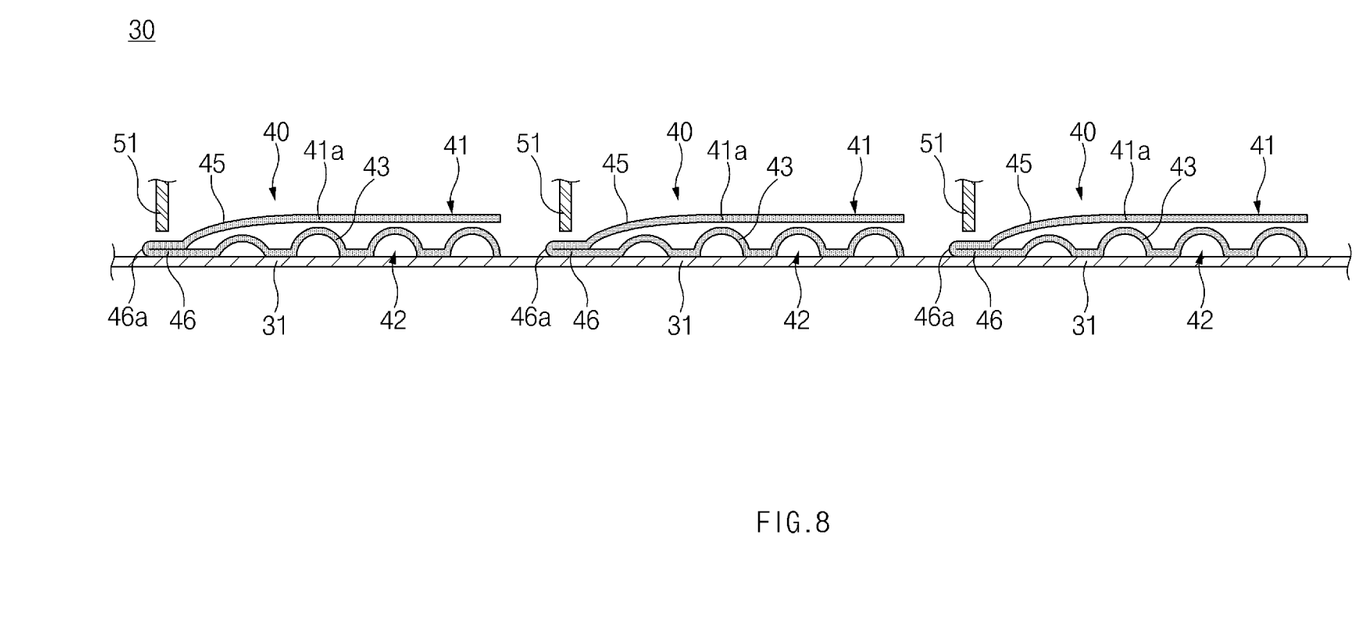
FIG. 8 is a section view illustrating the air foil thrust bearing according to the second embodiment of the present disclosure.

FIGS. 7 to 8 are views illustrating an air foil thrust bearing according to a second embodiment of the present disclosure.

Referring to FIGS. 7 to 8, an air foil thrust bearing 30 according to the second embodiment of the present disclosure may include a plurality of foils 40 attached to an upper surface of a base plate 31.

Referring to FIG. 7, each foil 40 comprises a top foil section 41, and a bump foil section 42 connected to and integral with top foil section 41.

Top foil section 41 has a flat upper surface 41a, which constitutes a load support surface.

Bump foil section 42 is connected to top foil section 41 by an inclined section 45, and bump foil section 42 may be located below top foil section 41.

Referring to FIG. 7, bump foil section 42 may comprise a plurality of bumps 43 spaced apart from each other by a specific distance. As shown in FIG. 7, in an example embodiment, the plurality of bumps 43 may protrude in a direction away from top foil section 41.

An inclined section 45 may be formed between top foil section 41 and bump foil section 42. According to an example embodiment, inclined section 45 may be inclined at a specific inclination angle to connect a periphery of top foil section 41 and a periphery of bump foil section 42, and the inclination angle of the inclined section 45 may correspond to a height difference between top foil section 41 and bump foil section 42. According to another example embodiment, inclined section 45 may be curved.

An attachment section 46 may be formed between a lower end of inclined section 45 and bump foil section 42, and may be attached to base plate 31 through welding or other suitable processes.

Attachment section 46 may be configured to have a specific length to form a space for performing welding using a welding machine 51. By disposing attachment section 46 between top foil section 41 and bump foil section 42 of each foil 40, the present disclosure may significantly reduce the number of welding operations as compared with conventional thrust bearings.

As illustrated in FIG. 7, a fold 46a may be formed in attachment section 46, and if bump foil section 42 is folded towards top foil section 41 using fold 46a of attachment section 46, as illustrated in FIG. 8, bump foil section 42 becomes located below top foil section 41 and bumps 43 of bump foil section 42 now protrude towards top foil section 41. That is, top foil section 41 and bump foil section 42 of foil 40 may be superposed on each other, and accordingly, top foil section 41 of foil 40 may be located above bump foil section 42.

Fold 46a may be formed at an intermediate portion of attached portion 46 or other various locations. For example, fold 46a may be formed at various locations of attachment section 46 such that bumps 43 of bump foil section 42 may be precisely located to correspond to a designed location of top foil section 41. Fold 46a may have be thinner than other sections of foil 40 to be folded more easily.

Further, as illustrated in FIG. 8, attachment sections 46 of foil 40 may be attached to base plate 31 using a welding machine 51 or the like while bump foil section 42 and top foil section 41 due to folding of folds 46a of attachment sections 46.

Because the remaining configurations and coupling relationships thereof are the same as or similar to those of the preceding embodiments, a detailed description thereof will be omitted.

According to the present disclosure, the number of assembled components of an air foil thrust bearing may be reduced by integrally forming the top foils and the bump foils, and accordingly, overall manufacturing costs may be reduced by reducing the number of welding processes and shortening process time.

Further, according to the present disclosure, the lengths of the flat portions of the top foils may be increased because the top foils and the bump foils are integrally formed, resulting in reduced dead zones for welding of the top foils and increased load support area. Accordingly, the stability may be improved during high-speed driving as the load support force increases.

Although the detailed embodiment of the present disclosure has been described, the present disclosure is not limited to the embodiment disclosed in the specification and the accompanying drawings, and the present disclosure may be variously modified by those skilled in the art without departing from the technical spirit of the present disclosure.

What is claimed is:

1. An air foil thrust bearing comprising:
   a base plate; and
   a plurality of foils attached to the base plate,
   wherein each of the foils comprises a top foil section and a bump foil section, and wherein the top foil section extends as a continuous piece in a circumferential direction to form the bump foil.

2. The air foil thrust bearing of claim 1, wherein the bump foil section comprises a plurality of bumps.

3. The air foil thrust bearing of claim 2, wherein the plurality of bumps protrude towards the top foil section.

4. The air foil thrust bearing of claim 3, wherein the plurality of foils are arranged on an upper surface of the base plate along a circumferential direction of the base plate.

5. The air foil thrust bearing of claim 4, wherein the top foil section of one foil is superposed on the bump foils of a circumferentially adjacent foil.

6. The air foil thrust bearing of claim 1, wherein the top foil section has a flat upper surface.

7. The air foil thrust bearing of claim 1, further comprising an inclined section formed between the top foil section and the bump foil section of a foil.

8. The air foil thrust bearing of claim 7, further comprising an attachment section formed between the inclined section and the bump foil section.

9. The air foil thrust bearing of claim 8, wherein the attachment section is attached to the base plate.

10. The air foil thrust bearing of claim 9, wherein the attachment section is foldable.

11. The air foil thrust bearing of claim 10 wherein when the attachment section is folded, the top foil section is superposed on the bump foil section.

12. The air foil thrust bearing of claim 11, wherein, prior to folding, the plurality of bumps protrude away from the top foil section.

* * * * *